United States Patent
Murakami et al.

(10) Patent No.: US 9,106,594 B2
(45) Date of Patent: Aug. 11, 2015

(54) PACKET BUFFERING SYSTEM AND METHOD

(71) Applicant: International Business Machines Corporation, Armonk, NY (US)

(72) Inventors: Masahiro Murakami, Kyoto (JP); Takehito Sakuragi, Kanagawa pref. (JP)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/955,271

(22) Filed: Jul. 31, 2013

(65) Prior Publication Data

US 2014/0161127 A1 Jun. 12, 2014

(30) Foreign Application Priority Data

Jul. 31, 2012 (JP) .................................. 2012-170275

(51) Int. Cl.
*H04L 12/861* (2013.01)
(52) U.S. Cl.
CPC .................................. *H04L 49/9078* (2013.01)
(58) Field of Classification Search
None
See application file for complete search history.

(56) References Cited

U.S. PATENT DOCUMENTS

| 5,515,539 A * | 5/1996 | Ohashi et al. ................. 713/324 |
| 8,010,742 B2 * | 8/2011 | Molaro et al. ................ 711/112 |
| 2004/0111649 A1 * | 6/2004 | Lin et al. ........................ 713/320 |
| 2008/0162980 A1 * | 7/2008 | Dahan et al. .................. 713/601 |
| 2009/0125739 A1 * | 5/2009 | Satoh ........................... 713/322 |
| 2009/0234989 A1 * | 9/2009 | Fischer .......................... 710/56 |
| 2012/0173806 A1 * | 7/2012 | Ryu .............................. 711/103 |
| 2013/0073794 A1 * | 3/2013 | Iwashiro ....................... 711/103 |

FOREIGN PATENT DOCUMENTS

| JP | 20000301802 A | 10/2000 |
| JP | 2002149479 A | 5/2002 |
| JP | 2003191570 A | 7/2003 |
| JP | 2005302002 A | 10/2005 |
| JP | 2009224867 A | 10/2009 |
| JP | 92009224867 A | 10/2009 |
| JP | 201113736 A | 1/2011 |
| JP | 2011022657 A | 2/2011 |

* cited by examiner

*Primary Examiner* — Hicham Foud
(74) *Attorney, Agent, or Firm* — Steven M. Kellner; Yuanmin Cai

(57) ABSTRACT

Embodiments of the present invention relate generally packet processing and, more particularly, to a system and method for buffering packets which reduces power consumption during the power saving mode of a system without dropping packets. The system and method may include a buffer controller that controls: a buffer, so that the buffer inputs and hold packets until a memory is operated by a stable supply of power; and the memory, so that the memory inputs and holds packets after it is operated by a stable supply of power after returning to a normal operating mode from a power saving mode.

3 Claims, 5 Drawing Sheets

PACKET BUFFERING SYSTEM AND METHOD

CROSS REFERENCE TO RELATED APPLICATION

This application claims priority under 35 U.S.C. §119 from Japanese Patent Application No. 2012-170275 filed Jul. 31, 2012, the entire contents of which are incorporated herein by reference.

BACKGROUND OF THE INVENTION

1. Field of the Invention

The present invention relates to packet processing; and, more particularly, to a system and method for buffering packets.

2. Related Art

There is great interest today in the question of how to reduce power consumption in electronic equipment. One power saving mechanism in printers is to shut down power to a system-on-a-chip (SoC) including the CPU for the engine and controller. The power saving mode requires support, so power is supplied only to the communication controller.

When a print-out request is received via the network during power saving mode, the printer returns to normal operating mode. After returning to this mode, packets coming in from the network are processed. The power-up sequence and booting in the return from the power saving mode to the normal operating mode require at least several hundred milliseconds (ms). During this time, the packets coming in from the network are dropped.

In order to reduce the number of packets dropped during this time, a buffer is provided in the communication controller receiving a supply of power during the power saving mode. However, a buffer in the communication controller consumes power, and it is critically important to minimize power consumption during the power saving mode which the printer resides in most of the time. When a large buffer is provided in the communication controller to reduce the dropping of packets, the increase in power consumption is proportional to the size of the buffer. When it takes more time to return to the normal operating mode, the size of the buffer and the amount of power consumed increases accordingly.

FIG. 1 shows an example of an energy efficient SoC with a packet buffer incorporated into the communication control unit. The SoC 100 has a voltage island (VI) area 110 in the communication controller which is powered at all times to monitor the network, a main area 120 to which power is shut down during standby mode, and a fence gate 130 separating these areas. The VI area 110 includes power management 111, packet filter management 112, a packet filter 113, and a buffer 114. The main area 120 includes reset logic 121, a CPU 122, an Ethernet media access controller (MAC) 123, and memory 124.

The power management 111, packet filter management 112, packet filter 113 and buffer 114 are configured using Wake-on-LAN (WOL) LSI circuits. These are embodied for example using a startup logic circuit, Ethernet packet analyzer/responder circuit, and a packet buffer circuit. The power management 111 receives the input of each power-good and reset signal to manage power supplied to the packet filter management 112 and the reset logic 121. The packet filter management 112 manages the packet filter 113 and the buffer 114, the packet filter 113 filters packets from the Ethernet receiver and outputs them to the buffer 114, and the buffer 114 holds the packets during the power saving mode and outputs them to the Ethernet MAC 123 during the normal operating mode. The Ethernet MAC 123 outputs the packets inputted from the buffer 114 to the CPU 122 and the memory 124. The reset logic 121 outputs reset signals to the CPU 122 and the Ethernet MAC 123, or to a phase-locked loop (PLL) and a built-in self-test (BIST) as well.

In a SoC 100 of the prior art, large-sized memory is provided as the buffer 114. Because this increases the circuit size of the VI area 110 itself, which receives power at all times, the amount of power consumed during power saving mode increases. Because the buffer 114 in the VI area 110 is separate from the memory, more power is consumed during the power saving mode, and the high-speed memory of the main area 120 cannot be obtained in the VI area 110 beyond the fence gate 130. Network retransmission is expected and dropped packets are tolerated, but this does not reliably contribute to the prevention of dropped packets because there is a limit to the number of retransmissions. A pause packet can be sent to temporarily stop frame transmission, but some hubs cannot use pause packets. Thus, the prior art does not provide a foolproof solution.

A network device is disclosed in Japanese Laid-open Patent Publication No. 2005-302002 which switches between two buffers, one for sleep mode and another for normal mode, so that packets are not dropped. A packet processing device is disclosed in Japanese Laid-open Patent Publication No. 2009-224867 which can save power when the input packet interval has been increased and the input traffic volume has been decreased. A printing device is disclosed in Japanese Laid-open Patent Publication No. 2003-191570 in which the CPU executes power saving controls when a packet has not been received within a predetermined period of time.

SUMMARY OF THE INVENTION

One aspect of the invention includes a packet buffering system. The packet buffering system includes: a buffer, which is provided in a voltage island area powered at all times in a system, for inputting, holding and outputting packets, a memory, which is provided in a main area whose power is shut down during the power saving mode of the system and which operates only by a stable supply of power, for inputting, holding and outputting packets, a selector, which is provided in the voltage island area, for i) inputting packets to be outputted from the buffer and the memory and ii) selectively outputting at least one packet, and a buffer controller, which is provided in the voltage island area, for controlling the buffer, the memory and the selector so that the i) buffer inputs and holds packets until the memory is operated by a stable supply of power, and so that ii) the memory, when the main area returns from the power saving mode to the normal operating mode through the supply of power, inputs and holds packets after the memory is operated by a stable supply of power.

Another aspect of the invention includes a packet buffering method for buffering packets in a buffer provided in a voltage island area powered at all times in a system, and a memory, which is provided in a main area whose power is shut down during the power saving mode of the system and which operates only by a stable supply of power. The method includes: capturing and holding a plurality of packets in the buffer, when the main area returns from the power saving mode to the normal operating mode through the supply of power and until the memory is operated by a stable supply of power, and capturing and holding a plurality of packets in the memory after the memory is operated by a stable supply of power.

DETAILED DESCRIPTION OF THE PREFERRED EMBODIMENTS

Figure 1:
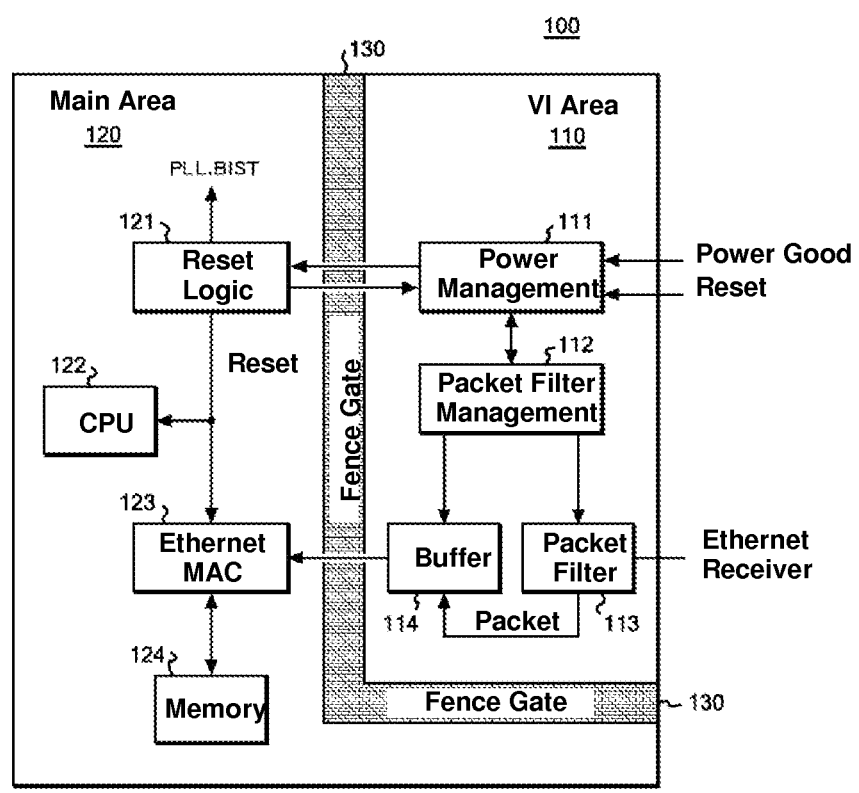
FIG. 1 is a diagram showing an example of an energy efficient SoC of the prior art in which a packet buffer has been incorporated into the communication control unit.

The purpose of the present invention is to realize packet buffering which reduces power consumption during the power saving mode of a system without dropping packets. The purpose of the present invention includes providing a system and method for realizing such packet buffering.

One aspect of the present invention is a packet buffering system having the following configuration. The packet buffering system includes: a buffer, which is provided in a voltage island (VI) area powered at all times in a system, for inputting, holding and outputting packets; a memory, which is provided in a main area whose power is shut down during the power saving mode of the system and which operates only by a stable supply of power, for inputting, holding and outputting packets; a selector, which is provided in the VI area, for inputting packets to be outputted from the buffer and the memory and selectively outputting either packet; and a buffer controller, which is provided in the VI area, for controlling the buffer, the memory and the selector so that the buffer inputs and holds packets until the memory is operated by a stable supply of power, and so that the memory inputs and holds packets after the memory is operated by a stable supply of power, when the main area returns from the power saving mode to the normal operating mode through the supply of power.

Preferably, the buffer controller controls the memory so that the memory does not input and hold packets after the return of the main area from the power saving mode to the normal operating mode has been completed.

Preferably, the buffer controller controls the memory and the selector so that the packets inputted and held by the memory are outputted by the selector until the return of the main area from the power saving mode to the normal operating mode has been completed.

Preferably, the buffer controller controls the memory so that select signals are provided in the period of after the memory is operated by a stable power supply until the return of the main area to the normal operating mode has been completed, and so that the memory inputs and holds packets and outputs packets through the selector while select signals are supplied.

Preferably, the buffer controller provides operating signals for the memory to input and hold packets, and a pair of selectors, each providing output to the memory, controls the memory so that the memory inputs and holds packets and outputs packets through the selector while select signals are provided, one of the pair of selectors selecting the operating signals when a select signal is applied and the other selecting a packet when a select signal is applied.

Preferably, the buffer controller controls the memory and the selector based on operable start time data for the memory and return operation end time data for the main area.

Preferably, the memory includes register array memory provided in the main area.

Another aspect of the present invention is a packet buffering method for buffering packets in a buffer provided in a voltage island (VI) area powered at all times in a system, and a memory, which is provided in a main area whose power is shut down during the power saving mode of the system and which operates only by a stable supply of power. This method includes: capturing and holding packets in the buffer until the memory is operated by a stable supply of power, when the main area returns from the power saving mode to the normal operating mode through the supply of power; and capturing and holding packets in the memory after the memory is operated by a stable supply of power.

Preferably, packets are captured and held in the memory until the return of the main area from the power saving mode to the normal operating mode has been completed, and packets are not captured and held in the memory after the return has been completed.

Preferably, packets are captured and held in the buffer and the memory until a packet controller provided in the main area is operating, and the packets held in the buffer and the memory are outputted to the packet controller after the packet controller is operating.

The present invention realizes packet buffering which reduces power consumption during the power saving mode of a system without dropping packets. More specifically, the present invention provides a packet buffering system and method which reduces the size of the buffer that is supplied power during the power saving mode, and thus the amount of power consumed, but also holds packets in the available memory and does not drop packets during the return to normal operating mode when power is no longer supplied in the power saving mode.

A preferred embodiment of the present invention will now be described in detail with reference to the drawings. However, the present invention as described in the scope of the claims is not limited to the following embodiment, and all combinations of features explained in the embodiment are not necessarily essential to the technical solution of the present invention. Also, the present invention can be embodied in different ways, and should not be interpreted as being limited to the details of the embodiment described below. All identical structural components and configurational elements are denoted by the same reference signs throughout the entire description of the embodiment.

Figure 2:
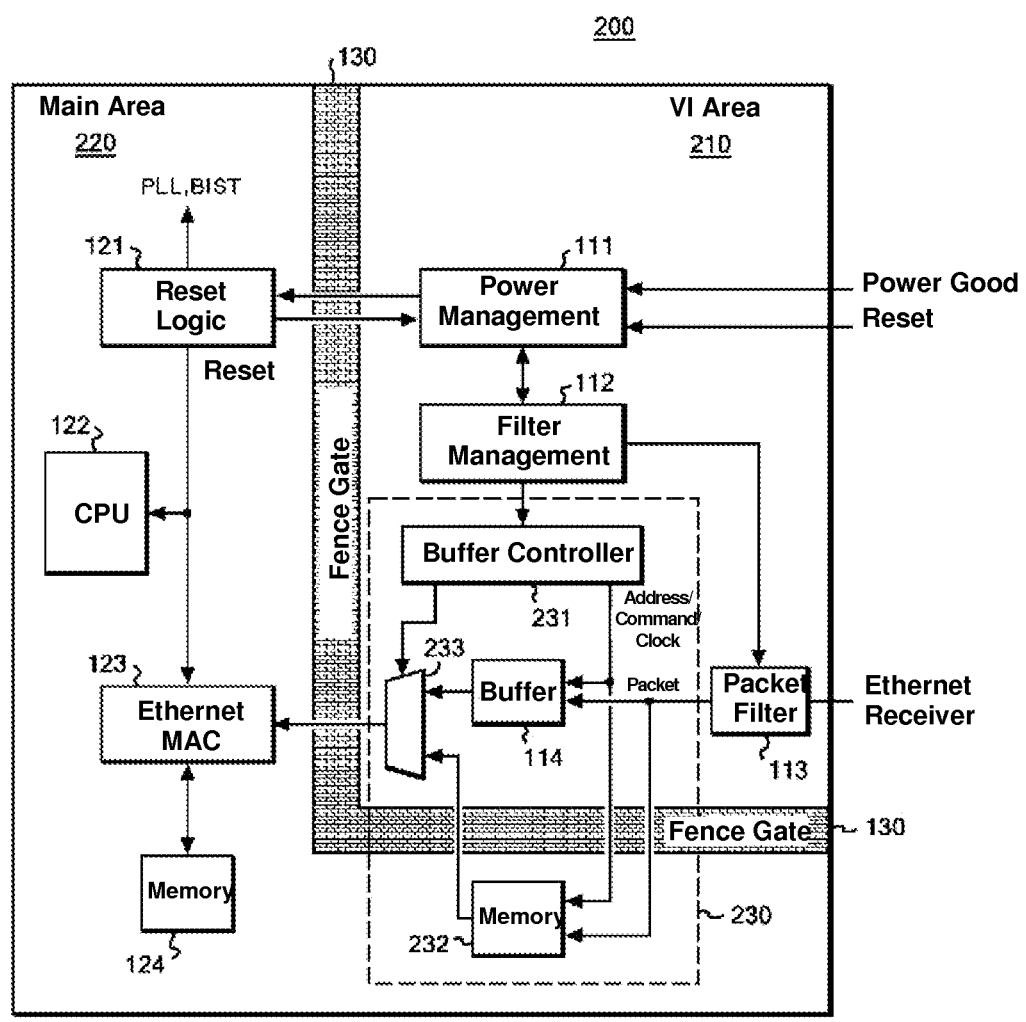
FIG. 2 is a diagram showing a configuration example of a packet buffering system according to an embodiment of the present invention.

FIG. 2 is a diagram showing a configuration example of a packet buffering system according to an embodiment of the present invention. In addition to a buffer 114, the packet buffering system 230 includes a buffer controller 231, memory 232, and a selector 233. The buffer controller 231 and the selector 233 are provided along with the buffer 114 in the VI area 210, and the memory 232 is provided in the main area 220.

A buffer controller 231 and a selector 233 are added to the VI area 210 which receives power even during the power saving mode, but their consumption of power is low compared to the buffer 114 and the memory 232, so the additional power consumption does not pose a problem. By buffering packets in the memory 232 provided in the main area 220 that does not receive power during the power saving mode, the buffer 114 itself in the VI area 210 is small, and there is a proportionate reduction in the amount of power consumed by the buffer 114, which can eliminate the increase in power consumed by the buffer controller 231 and the selector 233.

The buffer controller 231 receives a notification signal from the packet filter management 112 indicating packet input and a return to the normal operating mode, address/command/clock operating signals are outputted to the buffer 114 and the memory 232, and control signals are outputted to the selector 233. In response to a packet input notification signal, the buffer controller 231 provides address/command/clock operating signals, and the packet holding operation from the packet filter 113 to the buffer 114 is controlled. Also, in response to a notification signal indicating a return to the normal operating mode, the buffer controller 231 provides address/command/clock operating signals from the start time enabling operation of the memory 232, through the return operation, and until the memory 232 is operating, and the packing holding operation from the packet filter 113 to the memory 232 is controlled. Also, after the return operation has progressed to the return operation end time at which the main area 220 ends the return operation, the buffer controller 231 may perform controls so the packing holding operation from the packet filter 113 to the memory 232 is not performed.

The memory 232 is memory which is able to operate only when power is stably supplied. It can be, for example, a register array (RA). Therefore, the memory 232 can hold packets as a buffer in the period from after the power supply has become stable (power-good is enabled) until the main area of the SoC has been initialized (SRAM repair, PLL lock, initial boot, initialization of each function).

When the Ethernet MAC 123 has returned to the normal operating mode in response to a control signal from the buffer controller 231, the selector 233 selects the packets held in the buffer 114 and the packets held in the memory 232 and provides them to the Ethernet MAC 123. The selector 233 can be embodied, for example, using a multiplexer.

In the packet buffering system 230, when the main area 220 of the SoC 200 returns from the power saving mode to the normal operating mode, the packets to be processed by the Ethernet MAC 123 are buffered, during power-up and initialization of the functions lacking power, in the memory 232 of the main area 220 which is not powered up in the power saving mode. In this way, the memory capacity of the buffer 114 which has to remain powered during the power saving mode can be reduced, the circuit size and area of the VI area 210 can be reduced, and the amount of power consumed by the SoC 200 during the power saving mode can be reduced.

Figure 3:
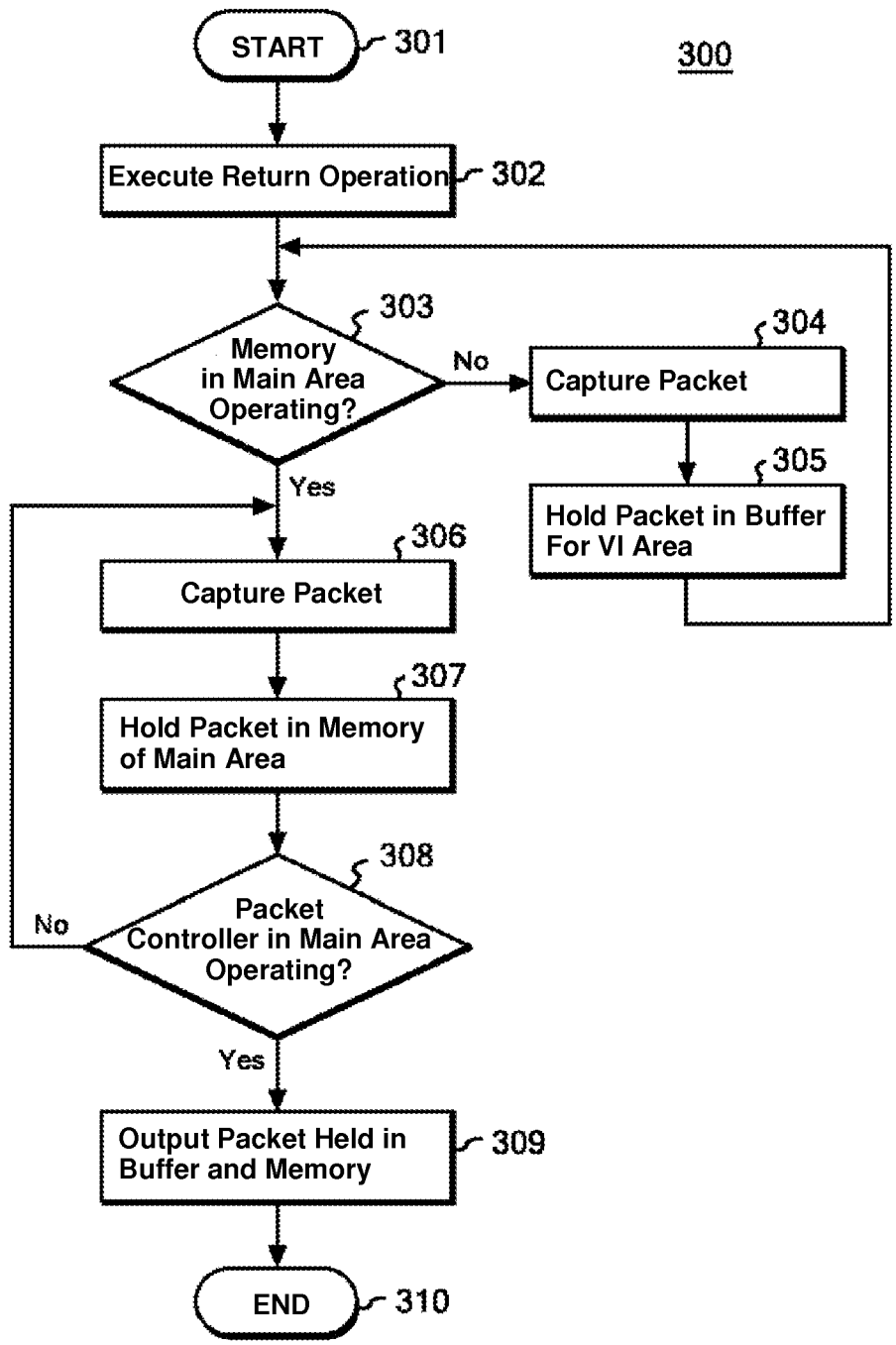
FIG. 3 is a diagram showing a packet buffering method according to an embodiment of the present invention.

FIG. 3 shows a flowchart of the a packet buffering method according to an embodiment of the present invention. The packet buffering method 300 starts when packets are inputted via the network during the power saving mode (Step 301). In response to the input of packets, a return is executed to the normal operating mode of the SoC (Step 302). Next, it is determined whether or not the memory that can only operate during a stable power supply to the main area is operating (Step 303). This determination can be embodied by using a comparator to compare the return operation lapsed time data to the operation start time data rendering the memory operational.

When the memory is still not operating (No), packets are captured (Step 304), the captured packets are held in the buffer of the VI area (Step 305), and the process returns to Step 303 to determine whether the memory is operating. This is repeated so that all incoming packets are captured and held in the buffer until the memory is operating (Steps 303, 304 and 305).

When it has been determined in Step 303 that the memory is operating (Yes), packets are captured (Step 306), and the captured packets are held in the memory (Step 307). Next, it is determined whether or not the packet controller such as the Ethernet MAC 123 in the main area is operating (Step 308). This determination can be embodied by using a comparator to compare the return operation lapsed time data to the operation start time data for rendering the packet controller operational. When the packet controller is not yet operational (No), the process returns to Step 306 to capture packets. This is repeated so that all incoming packets are captured and held in the buffer until the packet controller is operating (Steps 306, 307 and 308).

When it has been determined in Step 308 that the packet controller is operating (Yes), the packets held in the buffer and the memory are outputted to the packet controller (Step 309), and the process is ended (Step 310). Because the packet controller in the main area is operating at this time, the outputted packets can be accepted by the packet controller in the main area, and no packets are dropped.

Figure 4:
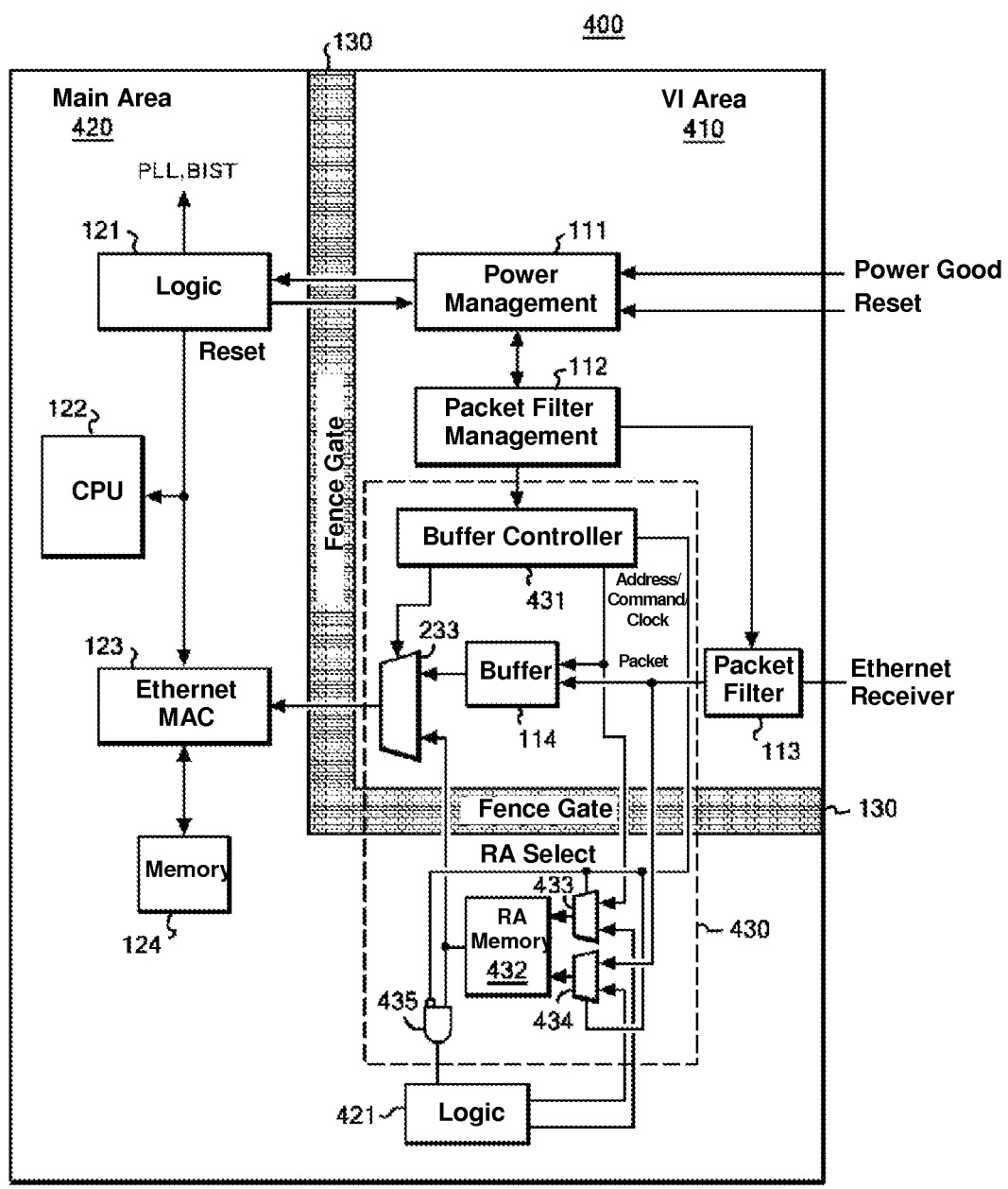
FIG. 4 is a diagram showing another configuration example of a packet buffering system according to an embodiment of the present invention.

FIG. 4 is a diagram showing another configuration example of a packet buffering system according to an embodiment of the present invention. In this packet buffering system 430, the main area 420 has RA memory 432 which serves as memory for buffering packets, but it can also be used for other uses in addition to packet buffering. The RA memory 432 is used for both packet buffering and other uses. For this reason, the buffer controller 431 sends RA select signals to the RA memory 432 in addition to address/command/clock operating signals. Also, a first selector 433 and a second selector 434 are provided on the input end of the RA memory 432. These can be embodied using, for example, a multiplexer. An AND gate 435 is provided on the output end of the RA memory 432. When the RA memory 432 is to be used for a purpose other than packet buffering, the RA memory 432 is placed under control of the logic 421.

The address/command/clock operating signals and the RA select signals are inputted from the buffer controller 431 to the first selector 433, and control signals are inputted from the logic 421 during the normal operating mode when the RA memory is used for its original purpose rather than as a packet buffer. In response to RA select signals, the first selector 433 switches between address/command/clock operating signals from the buffer controller 431 and control signals for the normal operating mode from the logic 421. For example, when the RA select signals are high (high potential), the RA memory 432 is switched to address/command/clock operating signals from the buffer controller 431, and when the RA select signals are low (low potential), the memory is switched to control signals for the normal operating mode from the logic 421.

Packets are inputted from the packet filter 113 to the second selector 434, and data is inputted from the logic 421 during the normal operating mode when the RA memory is used for its original purpose rather than as a packet buffer. In response to RA select signals, the second selector 434 switches between packets from the packet filter 113 and data for the normal operating mode from the logic 421. For example, when the RA select signals are high (high potential), the RA memory 432 holds packets from the packet filter 113, and when the RA select signals are low (low potential), data for the normal operating mode is captured from the logic 421 and held.

Output data from the RA memory 432 is inputted to the AND gate 435, and RA select signals are inputted from the buffer controller 431. When the RA memory 432 is used as a packet buffer, the AND gate 435 prevents the outflow of data from the RA memory 432 to the main area 420. For example, when the RA select signals are high (high potential), the AND gate 435 outputs NO (0) as one of the outputs. The other input is data from the RA memory 432, and all of the data is outputted as NO (0). When the RA select signals are low (low potential), the gate outputs YES (1) as one of the outputs. The other input is data from the RA memory 432, and all of the data is outputted as it is. As a result, the main area 420 is not adversely affected by the use of the RA memory 432 as a packet buffer.

Figure 5:
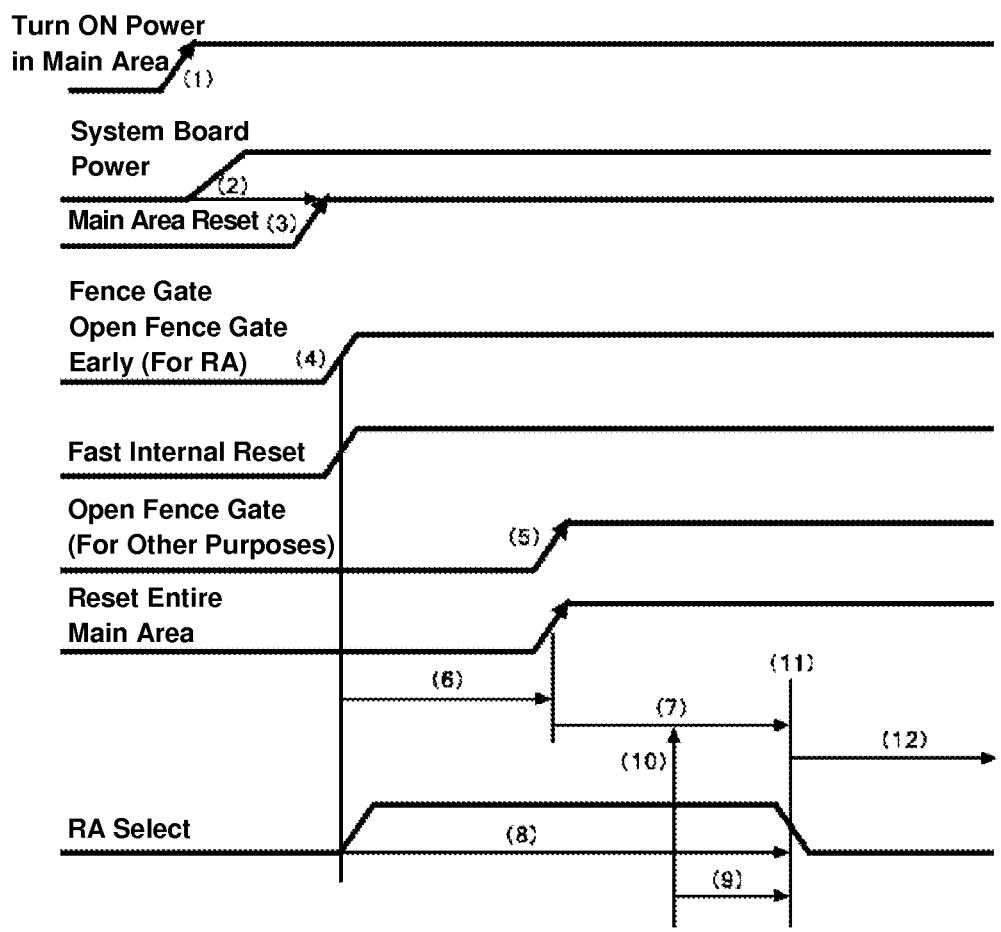
FIG. 5 is a waveform diagram of each signal indicating an operation performed by the packet buffering system of FIG. 4.

FIG. 5 is a waveform diagram of each signal for the operations performed by the packet buffering system 430. The first waveform indicates the signal for powering up the main area 420. A trigger (WakeUp) is received to return the SoC 400 from the power saving mode to the normal operating mode, and the main area 420 is powered up on timing (1). The second waveform indicates the signals for system board power. Power-up of the main area 420 on timing (1) is received, and the system board is powered up on timing (2). The third waveform indicates the reset signal for the main area 420. Power stability of the main area 420 is awaited by the reset logic 121, and the reset is released on timing (3). The reset-release timing is determined, for example, by the time constant of the reset logic 121.

The fourth waveform indicates the signal for opening the fence gate early (for the RA), and the fifth waveform indicates the signal for fast internal reset. By releasing the reset on timing (3), the power to the main area 420 is stabilized and the initial reset is released on the same timing as (4) (see the fifth waveform), and the fence gate is released for the register array (RA) in the main area 420 on timing (4) (see the fourth waveform). This makes the RA memory 432 available as a packet buffer.

The RA select signal indicated by the eighth waveform at the bottom of the chart becomes high (high potential) on timing (4). The high RA select signal allows the buffer controller 431 in the VI area 410 to write received packets from the packet filter 113 to the RA memory 432 during period (8).

The sixth waveform indicates the fence gate release signal (for other purposes), and the seventh waveform indicates the reset signal for the entire main area. After timing (4), period (6) occurs (approximately 10 ms) to perform PLL lock, SRAM repair and BIST, etc. the main area 420. The reset is released in the entire main area 420 on the same timing as (5) (see the seventh waveform), and the fence gate is released on timing (5) related to signals communicating for other purposes with the non-RA main area 420 (see the sixth waveform).

After timing (5), the CPU 122 in the main area 420 starts the ROM boot. Period (7) is the ROM boot period. The CPU 122 initializes devices in the ROM boot period (7). The Ethernet MAC 123 is one of the initialized devices. When the Ethernet MAC 123 has been set on timing (10), the Ethernet MAC 123 is available to receive packets. Packets can then be transferred from the RA memory 432 to the Ethernet MAC 123 during period (9).

The ROM boot performed by the CPU 122 in period (7) is ended and the transfer of packets from the RA memory 432 to the Ethernet MAC 123 in period (9) is ended on timing (11), during which the RA select signal is low (low potential). The CPU 122 allows the RA memory 432 to be used for its original purpose, RA memory, and the RA memory 432 is used as RA memory for an application by the CPU 122 during period (12).

The present invention was described using an embodiment, but the technical scope of the present invention is not in any way limited to the description of the embodiment. The embodiment can be changed and improved in many ways, and embodiments including these changes and improvements are naturally included in the technical scope of the present invention.

What is claimed is:

1. A packet buffering system comprising:
   a buffer, which is provided in a voltage island area powered at all times in a system, for inputting, holding and outputting packets;
   a memory, which is provided in a main area whose power is shut down during the power saving mode of the system and which operates only by a stable supply of power, for inputting, holding and outputting packets;
   a selector, which is provided in the voltage island area, for i) inputting packets to be outputted from the buffer and the memory and ii) selectively outputting at least one packet; and
   a buffer controller, which is provided in the voltage island area, for controlling the buffer, the memory and the selector so that the buffer inputs and holds packets until the memory is operated by a stable supply of power, and so that:
   i) when the main area returns from the power saving mode to the normal operating mode through the supply of power, the memory inputs and holds packets after the memory is operated by a stable supply of power,
   ii) after the return of the main area from the power saving mode to the normal operating mode has been completed, the memory does not input and hold packets,
   iii) until the return of the main area from the power saving mode to the normal operating mode has been completed, the packets inputted and held by the memory are outputted by the selector, and
   iv) in a period after the memory is operated by a stable power supply and until the return of the main area to the normal operating mode has been completed, select signals are provided and the memory inputs and holds packets and outputs packets through the selector while the select signals are supplied,
   wherein the buffer controller provides operating signals for the memory to input and hold packets, and a plurality of selectors, each providing output to the memory, one of the plurality of selectors selecting the operating signals when a select signal is applied and the other of the plurality of selectors selecting a packet when a select signal is applied.

2. The packet buffer system according to claim 1, wherein the buffer controller controls the memory and the selector based on operable start time data for the memory and return operation end time data for the main area.

3. The packet buffer system according to claim 1, wherein the memory includes register array memory provided in the main area.

* * * * *